May 2, 1944.   L. A. HATCH ET AL   2,347,684
COATING CALCINABLE LITHIC SLAB
Filed Dec. 9, 1938
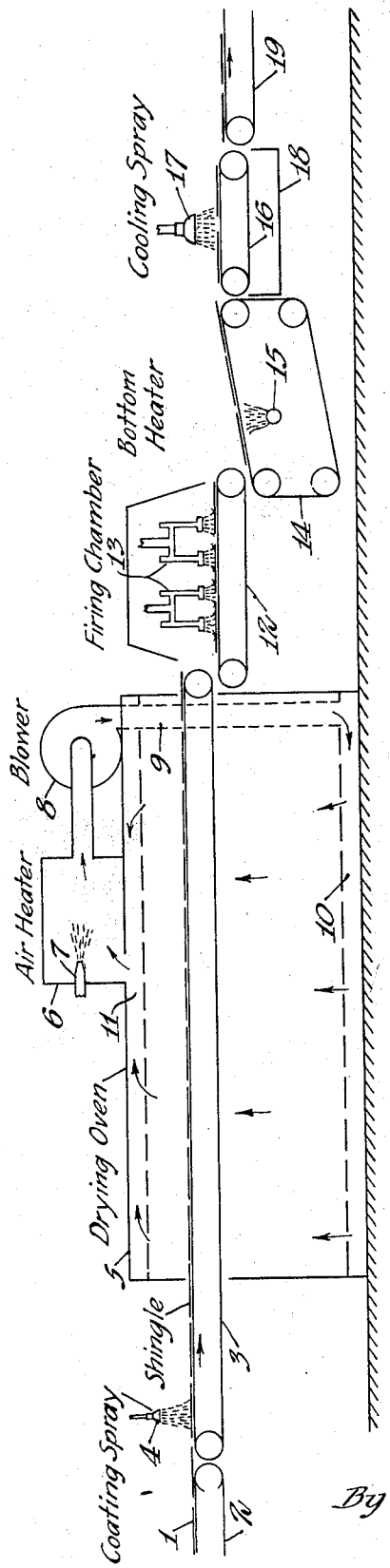
Inventors
Lloyd A. Hatch
Maurice E. Buzzell
By Paul Carpenter
Attorney Patented May 2, 1944

2,347,684

UNITED STATES PATENT OFFICE 2,347,684

COATING CALCINABLE LITHIC SLABS

Lloyd Arthur Hatch, St. Paul, and Maurice Edwin Buzzell, Mahtomedi, Minn., assignors to Minnesota Mining & Manufacturing Company, St. Paul, Minn., a corporation of Delaware Application December 9, 1938, Serial No. 244,804

18 Claims. (Cl. 117—126)

This invention relates particularly to the coating of calcinable, lithic slabs with a firmly bonded, thin, siliceous coating which is unfused and unvitrified, yet is highly durable, water-resistant, weather-proof, non-blooming and uncrazed; and which may be variously colored to present a bright, non-fading, colored surface which is resistant to permanent discoloration due to atmospheric deposition and which may be washed and scrubbed when dirty to clean and restore substantially the original color value and without appreciable loss of coating material.

The invention embraces a process of producing such a finished coating by heat treatment of the applied coating composition without producing a substantial destructive action upon the underlying base, even though the latter is not refractory but is calcinable in that it will not stand moderately prolonged heating to such moderately high temperatures as 700–1100° F., which is the range of temperature which we generally use in setting up the type of coating composition which we employ in accordance with this invention.

The calcinable, lithic slab base material constitutes a self-sustaining sheet material which is comparatively massive, thick and inflexible. It is exemplified, for example, by asbestos cement roofing such as shingles, and by sidings, tiles, wall board, building blocks and pipes, etc.

Asbestos cement shingles, for example, are widely used, but possess well recognized faults which have not heretofore been successfully overcome, for they bloom, collect dust and dirt which cannot be readily washed off, and are difficult to color. Attempts to color them by incorporation of coloring material have resulted in shingles which lack a bright color and there is fading, change of shade, and streaking upon exposure to the atmosphere; in addition to which there is lack of economy due to the unused coloring material below the surface. Colored coatings heretofore employed or proposed for use on such shingles lack, in whole or in part, such desired characteristics as durability, weatherproofness, freedom from cracking and crazing, freedom from substantial blooming of the coating or blooming of the base through the coating or both, resistance to fading and streaking, adequate intensity of color, a type of surface from which collected dust and dirt may be washed or scrubbed without appreciable harm to the surface, etc. Fused or vitrified ceramic coatings, requiring firing at high temperatures, cannot be applied because of the destructive action of the required heat upon the base material, as regards mechanical strength and warping, etc. Even the use of coatings which are not heated to vitrification may require heating to an extent which causes warping of the base; and dehydration to the point where the cement will not "come back," thus causing permanent loss of mechanical strength; and the previously proposed coatings are not fully satisfactory. The problem is a particularly difficult one because such shingles are intended for permanent installation and on a house, for example, are intended to last as long as the house, so that no replacement of the roof is required, excepting as to such individual shingles as may occasionally become cracked or otherwise damaged for one reason or another. Hence a coating which will be satisfactory for a few years, or even for a decade or so, cannot be regarded as fully meeting the need. Furthermore, a commercially satisfactory answer must not involve an expensive type of coating method or material, and this is true of our invention, in accordance with which highly effective coatings are provided as heretofore indicated.

While the invention was developed with special reference to meeting the need for improved coatings for asbestos cement sheet material, it is not limited to the coating of such bases, but applies generally to the coating of bases involving the problem of dealing with calcinable lithic slab material which suffers from heating at moderately elevated temperatures, due to dehydration, loss of other volatile material or chemical change; producing such results of destructive calcination as crumbling, embrittlement, cracking, loss of strength, warping etc. In this connection it is pointed out that in the case where an asbestos cement base is employed, neither the asbestos nor the cement (commonly Portland cement) is required as such to produce a satisfactory coating, and hence entirely different calcinable base slabs may be satisfactorily coated in accordance with this invention, since the ingredients of the applied coating composition are self-sufficient.

Other objects, features and advantages of the invention will be made apparent during the course of the description.

The finished siliceous coating may be characterized as a heat-reacted cement which is substantially unfused and unvitrified and is comprised of a substantially insoluble, non-glassy, alkali-alumina-silica combination. It may be produced, for example, by a solid-phase reaction between: (A) a film-forming soluble alkali silicate (exemplified by sodium silicate and potassium silicate, materials sometimes referred to as "water-glass," of the sodium or potassium type) and, (B) an argillaceous aluminum silicate (exemplified by clay, of which kaolin is the preferred type). The alkali silicate customarily used is in the form of a solution containing approximately 40% by weight of sodium silicate, the latter preferably having a silica ratio of 2.0–3.22 (i. e. 2.0–3.22 parts by weight of $SiO_2$ per part of $Na_2O$). While kaolin is the preferred form of argillaceous aluminum silicate, other clays may be used, such as fuller's earth, and use may be made of pyrophyllite, kyanite and even feldspar, singly or in mixtures with each other and/or in admixture with kaolin. The kaolin is preferred because of its purity and the physical properties which it contributes. Artificial mixtures may be used, formed by combining alumina and silica; an expedient which makes possible not only high purity and uniformity but permits of securing variations in composition and physical properties not found in natural products. The objects is to "insolubilize" the film-forming alkali silicate by the use of alumina, using an appropriate blend in which the alkali, alumina and silica are proportioned to secure the desired type of coating upon firing for a temperature and time which will not result in destructive calcination of the base. Hence the expedients specifically described are not to be regarded as limiting the scope of the invention.

The base is coated with a mixture of the alkali silicate solution and aluminum silicate, and such modifying or auxiliary agents as may be desired, together with a coloring pigment when a colored coating is desired, as is ordinarily the case. It is then heated so as to partially dry and set the coating and to condition the base and its coating so as to substantially avoid intumescence of the coating and destructive calcination of the base during said heating and the subsequent firing; and is then fired by heating of the coating so as to set up the coating while avoiding destructive heating of the slab as a whole. Such firing may be accomplished by exposing the coated surface to a radiant heater or by directing a gas flame toward the surface, for example. The firing temperature to which the coating is raised is preferably within the range of 700–1100° F. and the time of exposure to firing temperatures is desirably less than 5 minutes and preferably less than 2 minutes, a period of 15–60 seconds being possible with our method, thus minimizing heating of the body of the slab.

Further details regarding the coating composition will be set forth following the description of the method which is illustrated in the accompanying drawing, which is in the nature of a flow-sheet and merely diagrammatic.

For purposes of illustration, the drawing shows the coating of asbestos cement shingles 1. These are brought to the treating system by conveyor 2 upon which they are arranged in close succession and transversely. They are transferred to chain conveyor 3 and pass beneath coating spray 4, which sprays on the coating solution. Where the shingles are intended to be laid with substantial overlap, only the portion to be exposed, plus a small margin, together with the adjacent edge and butt surfaces, need be sprayed; but when desired the entire side may be sprayed, as where the shingle is of a type which is laid with little overlap; and of course such bases as tiles would have one entire side coated. It will be understood that the coating solution may be applied in other ways, and it may be desirable with some types of bases to dip them in the coating solution.

The coated shingles then pass through drying oven 5, which is arranged to provide a good cross-circulation of heated air past the shingles in order to facilitate uniform drying and to avoid localized overheating. The air is heated in chamber 6, as by gas burner 7, is passed by the blower and conduit system 8 to ducts 10 located at the bottom of the oven, from whence the heated air rises past the shingles and is recirculated to the heating chamber by means of ducts 11 located at the top of the oven.

The temperature is substantially the same throughout the length of the oven and is preferably kept within the range of 400°–600° F., with the coated slabs preferably being kept in the oven for about one-half hour or less. With some shingles and coating compositions it has been found that 7–10 minutes suffice. The drying should proceed as rapidly as possible, consistent with avoidance of intumescence of the coating, in order to minimize harming the base by calcination, and this is possible with our method. The purpose of the drying is to partially dehydrate both the coating composition and the base. The coating becomes partially set as a cohesive film, and its dehydration and heating prevent intumescence when later fired. The base is heated and partly dehydrated so as to avoid exploding and cracking when subjected to the firing operation, and in the case of asbestos cement shingles about 35–50% of the moisture is driven off. In addition, the shingle is warped convexly upwardly to largely or entirely offset the reverse type of warping which occurs during firing.

The best combination of temperature and time can best be determined in any case by trial and will of course depend upon the type and moisture content of the base, the thickness and composition of the coating, design of oven and degree of air circulation, etc.

The shingles leaving the drying oven are transferred to chain conveyor 12 and pass through a firing zone or chamber, where they are fired by heat applied to the coated surface, as by means of gas burners 13 which are arranged above the conveyor and directed downwardly. Even when the shingles are only partly coated on the upper surface, the heat may be applied to the entire surface, since with our method the temperature and duration of firing are insufficient to harm the base material. So far as producing substantial completion of the reaction is concerned, only a very short firing time seems necessary, and because of the mechanical condition of the coating which results from the use of the clay, dehydration of the coating proceeds quite rapidly without intumescence, since the formation of a surface skin is prevented, and passage out of moisture from within the body of the coating is facilitated.

The firing method produces a tendency to warp the shingle concavely upwardly, i. e. in an opposite way to the warping produced during the preceding heating step, so that the result is an unwarped shingle when a proper balance is effected between the heating operations. If the firing step over-corrects the warp produced by the precedent heating step, a proper balancing may be obtained by heating the bottom of the shingle, either immediately before or after firing, which heating is not enough to harm the shingle.

The shingles leaving the firing zone are transferred to conveyor 14 for air-cooling. Bottom heating of the shingles may be effected by gas burner 15, for example, located to heat the bottoms of the shingles shortly after leaving the firing zone. This is optional, but the expedient permits of close control to secure unwarped shingles. In fact it may be considered advisable to deliberately adjust the relative heating actions in the heating oven and firing zone so that the shingles will be somewhat warped concavely upwardly by the firing, and then bring them back to an upwarped condition by the bottom heating subsequent to firing. Since such bottom heating will occur just prior to cooling of the shingles, the closest control can be obtained, for it is only necessary to watch the finished shingles and to adjust the bottom heating from time to time, if conditions change, to secure immediate correction.

Following heating, the shingles become cooled in moving along with conveyor 14 and may then be transferred to conveyor 16 for such further treatment as may be desired, as for example spraying with water supplied by spray head 17 located above the conveyor. Such spraying not only hastens the cooling but may be used to cause rehydration of the shingle base. The water that runs off is collected by catch basin 18 and may be recirculated.

It may be considered desirable to include some treating agent in the water. For example, a 1% solution of calcium chloride may be applied as a fine mist spray in order to leave a thin unnoticeable deposit of calcium chloride on the final coating. The calcium chloride does not react with the coating, but serves as a hygroscopic agent which functions to produce an even slighter tendency of the coating to bloom in case the specific form of coating application makes it desirable to do this to approach more closely to perfection. Even without the use of the hygroscopic agent, our method makes it possible to secure a coating that may properly be designated as non-blooming, using this term in a practical sense to indicate a degree that is considered fully acceptable by the trade.

The shingles are then transferred to conveyor 19 and taken to storage or other destination as finished products.

*Example of coating solution*

| | Parts |
|---|---|
| Kaolin | 50 |
| Titanium oxide pigment | 50 |
| Cryolite | 10 |
| Sodium silicate solution (silica ratio 2.6) (88 parts on dry basis) | 220 |
| Water | 30 |

In the above formula all parts are by weight. The ingredients are blended by ball-milling until well homogenized and the resultant coating solution is ready for spraying or other method of application. The degree of fluidity can be varied by changing the proportion of total water.

This formula is preferably fired at about 850° F. and produces a coating having a very strong and brilliant white color. The titanium oxide pigment may be substituted for by other pigments for producing various colors as, for example, iron oxide for red, chrome oxide for green, ultramarine for blue, manganese dioxide for black, or a combination of pigments, such as iron oxide and manganese dioxide to give a rich chocolate, and chrome oxide and manganese dioxide to give a dark subdued green. These pigments generally do not enter into the insolubilizing reaction between the kaolin and alkali silicate, although pigments of the nature of iron oxide may enter slightly into the insolubilizing reaction without harming the quality of color of the finished coating. The pigment may be omitted, although this requires a different proportioning of components as hereinafter indicated in describing the proportion of alkali silicate to be used.

The cryolite (sodium-aluminum-fluoride), which is an example of a substantially water-insoluble complex fluoride, and which may be replaced by sodium-silico-fluoride, for example, is employed as a secondary insolubilizing agent, and although it is not an essential component, it does produce a coating of greater insolubility than when omitted, due in our opinion to the formation of more complex silicates.

The composition and proportion of the alkali silicate is of great importance in securing best results. The foregoing formula example illustrates a composition intended primarily for use with a firing temperature of about 850° F.

The ratio of silica to alkali of the alkali silicate determines the extent to which the insolubilization reaction will take place at the particular firing temperature, with any particular proportion of alkali silicate to kaolin, and this latter proportion is dictated primarily by physical considerations as hereinafter described. The silica ratio is computed as the ratio of parts by weight of $SiO_2$ to alkali oxide ($Na_2O$ in the case of sodium silicate). Best results are obtained by using a sodium silicate having a silica ratio within the range of 2.0 to 3.22. It should be clearly understood that we refer to the silica ratio of the sodium silicate prior to admixing with the kaolin, since the latter also contains silica. With a ratio above 3.22 there is a greater tendency for the coating to intumesce during the heating operations and the coating does not dry out so well and so quickly. A ratio much less than 2.0 results in an excessively alkaline coating. A silica ratio of 3.22 makes possible a firing temperature of 750° F. to secure a highly insoluble coating. With a silica ratio of 2.0 it is necessary to go up to about 950° F. to get an equal insolubility. It is preferred to use an equal mixture of the 3.22 and 2.0 types (these being common commercial forms), so as to have a sodium silicate with a silica ratio of approximately 2.6, and to use a firing temperature of about 850° F. This may be regarded as involving a balancing of factors to secure high insolubility on the one hand and on the other hand to secure minimization of harm to the cement base and low tendency to intumesce. It will be understood that a ratio of 4.0 may be used, for example.

The proportion of alkali silicate to the total of other solids is important. If the proportion is too high there is too much tendency for intumescence to occur, while if it is too low the finished coating is undesirably porous and the surface is undesirably dull. A good coating will be sufficiently permeable or porous to permit breathing of moisture by the underlying base, yet will appear continuous even when viewed under a microscope using a magnification of 100X. Excessive porosity will greatly facilitate blooming through from the base and will interfere with maintenance of a clean surface. A good coating will have a dull satin surface with a slight gloss.

A proportion range of 0.5–1.2 parts by weight of sodium silicate per part of total other solids is preferred. The optimum proportion depends upon the silica ratio. With a silica ratio of 2.0, a proportion of approximately 0.6 is preferred, while with a silica ratio of 2.6 a proportion of 0.8–1.0 is preferred. These figures refer to the proportion of sodium silicate on a dry basis to the rest of the solids. Usual types of commercial sodium silicate solutions generally contain approximately 40% sodium silicate, so that the proportion on a solution basis would then be 2.5 times the values given above. These figures are based primarily on observations of the type of formula stated in the example, where there is an equal amount of kaolin and pigment. However, neither omission of the cryolite nor substantial change in the amount of pigment seems to have much, if any, effect on the proportion of sodium silicate to total other solids that is required to produce best results.

It will be understood that in any given case the best proportion should be determined by trial, but consideration of the foregoing figures will greatly assist in this.

The kaolin, or equivalent argillaceous aluminum silicate, is desirable both from the chemical and physical standpoints. Chemically, it reacts with the alkali silicate in solid phase during firing to produce a highly insoluble coating. Physically, it reduces the tendency to intumescence and facilitates drying out of the coating. Hence, as compared with the use of alkali silicate alone (with or without pigment), the clay makes possible lower firing temperatures, a shorter firing time, greater insolubility of the finished coating, and in general a better product. The limited firing results in a coated shingle which has substantially the same mechanical strength as it had before coating. Cracking and crazing of the coating are also avoided by our method of coating.

The coating solution is preferably applied so as to result in a finished coating having a thickness of the order of 3 mils. This thin coating is more resistant to the effect of freeze and thaw than thicker coatings, and yet is durable enough to stand abrasion in handling of the shingle or other product.

Having described various embodiments of our invention, but without intent to be limited thereto, what we claim is as follows:

1. A continuous process of producing weatherproof siliceous coatings upon asbestos cement slabs, comprising coating the slabs with an aqueous solution of alkali silicate intimately admixed with an argillaceous aluminum silicate and a coloring pigment, the latter two components being roughly equal in amount and the alkali silicate on a dry basis amounting to approximately 0.5–1.2 parts per part of the total other solids in the coating, moving the coated slabs in succession through a heating zone and subjecting them therein to a uniform cross-current of heated air having a temperature of 400–600° F. for not exceeding approximately one-half hour to partially dehydrate the coating and condition the slabs and coatings for subsequent firing, moving the thus heated slabs in succession through a firing zone and subjecting them therein to a firing heat applied directly to the coatings so as to minimize heating of the bodies of the slabs, each coating being fired to a temperature of 700–1100° F. for not exceeding approximately five minutes.

2. A process of producing a water-proof siliceous coating upon an asbestos cement shingle, comprising coating the shingle on one side with an aqueous solution of alkali silicate intimately admixed with an argillaceous aluminum silicate, there being approximately 0.5–1.2 parts of alkali silicate on a dry basis per part of total other solids in the coating, heating the coated shingle in a manner to condition it so as to substantially avoid intumescence of the coating and destructive calcination of the shingle during heating and subsequent firing and so as to warp the shingle oppositely to the warping produced by the subsequent firing, firing the coating by applying the firing heat directly to the coating so as to minimize heating the body of the shingle and at a maximum temperature of 700–1100° F. and for a time which produces a degree of warping more than offsetting said warping produced during said prior heating step, and separately heating the uncoated side of the shingle at any appropriate time subsequent to said prior heating step to an extent which will result in the finished shingle being substantially unwarped.

3. A process of producing a water-proof siliceous coating upon an asbestos cement slab, comprising coating the slab with an aqueous solution of sodium silicate having an initial silica ratio of 2.0–3.22, kaolin and coloring pigment in roughly equal amounts, and a minor proportion of a water-insoluble complex fluoride capable of augmenting the kaolin in insolubilizing the coating, the sodium silicate on a dry basis constituting approximately 0.5–1.2 parts per part of total other solids in the coating, heating the coated slab by a cross-current of heated air having an elevated temperature not exceeding about 600° F. in order to condition the slab and coating so as to substantially avoid intumescence of the coating and destructive calcination of the slab during heating and subsequent firing, and firing the coating by applying firing heat directly to the coating so as to minimize heating the body of the slab, the firing temperature being 750–950° F. and the firing time not exceeding five minutes.

4. An article of manufacture comprising a substantially inflexible flat sheeted preformed calcinable lithic cement slab having a weatherproof unfused, unvitrified and adherent siliceous coating formed in situ on surfaces thereof and comprised of the fired unvitrified solid-phase reaction product of coating ingredients comprising an argillaceous aluminum silicate and a film-forming alkali silicate, which are combined and reacted by heat so as to constitute a substantially insoluble and non-blooming product, the said slab being substantially free from the effects of destructive calcination.

5. An article of manufacture comprising a preformed calcinable sheeted asbestos-Portland cement slab having a weather-proof unfused and unvitrified adherent colored siliceous coating formed in situ and comprised of the fired unfused and unvitrified solid-phase reaction product of coating ingredients comprising an argillaceous aluminum silicate and a film-forming sodium silicate and a pigment, which are combined, by first drying the coating at a temperature not exceeding 600° F. and then firing the same at a temperature of approximately 850° F., so as to constitute a substantially insoluble and non-blooming product, the applied sodium silicate being in the proportion on a dry basis of approximately 0.5–1.2 parts per part of the total other solids of the coating, and the said cement slab being substantially free from the effects of destructive calcination.

6. An article of manufacture comprising a preformed sheeted substantially inflexible calcinable calcareous lithic cement slab having an adherent weather-proof unfused, unvitrified and substantially non-blooming colored siliceous coating presenting a non-fading colored surface, said coating being formed in situ and comprised of the solid-phase reaction product of coating ingredients comprising an argillaceous aluminum silicate and a film-forming aqueous sodium silicate and including a coloring pigment, said ingredients being dried at a superatmospheric temperature below 600° F. and then fired at a higher temperature, the said sodium silicate being present in the proportion, on the dry basis, of approximately 0.6–1.0 part by weight per part of the total other solids of the coating and the mol ratio of $SiO_2$ to $Na_2O$ being between 2.0/1 and 3.22/1, the said cement slab being substantially free from the effects of destructive calcination.

7. An article of manufacture comprising a preformed hydrated calcinable lithic slab comprising a calcareous cement having a weather-proof non-blooming unfused unvitrified non-intumesced siliceous coating presenting a permanently bright colored surface that appears continuous when viewed under a microscope using a magnification of 100X, the coating being permeable to permit breathing of moisture by the underlying slab therethrough, said coating being formed in situ and largely composed of a pigment and the solid-phase reaction product of kaolin and film-forming sodium silicate which have been first dried in situ at a superatmospheric temperature below 600° F. and then fired at a temperature within the range of 700–1100° F., said cement slab being substantially free from the effects of destructive calcination.

8. An article of manufacture comprising a substantially inflexible calcinable sheeted slab comprising Portland cement having a weather-proof unfused and unvitrified non-intumesced colored siliceous coating formed in situ and comprised of the heat reaction product of an intimate admixture of coloring pigment, a water-insoluble complex fluoride, an argillaceous aluminum silicate and a film-forming alkali silicate, said alkali silicate being present on a dry basis to the extent of 0.8–1.0 part per part of total other solids and the mol ratio of silica ($SiO_2$) to alkali metal oxide in said alkali silicate being at least about 2.6 but not greater than 3.2, to produce a substantially insoluble and non-intumesced coating, and fired to a temperature above 700° F., said slab being substantially free from the effects of destructive calcination and said coating being substantially non-blooming, being permeable to permit breathing of moisture by the underlying slab therethrough, and having a thickness of the order of 3 mils.

9. An article of manufacture comprising a flat sheeted asbestos cement slab having a weather-proof unfused and unvitrified, non-blooming, non-intumesced colored siliceous coating firmly bonded thereto, the coating being formed in situ and comprised of the fired solid-phase reaction product of coating ingredients comprising kaolin and film-forming alkali silicate and including a coloring pigment, said alkali silicate being in the proportion on the dry basis of 0.5–1.2 parts by weight per part of total other solids and the mol ratio of silica to alkali metal oxide in said alkali silicate being from 2.0–3.22, the coating being composed such that its surface may be washed and scrubbed when dirty to clean and restore substantially the original color value and without appreciable loss of the coating material and the surface appearing continuous when viewed under a microscope using a magnification of 100X, and the slab being substantially free from the effects of destructive calcination, and said coating being permeable to permit breathing of moisture by the underlying slab therethrough and having a thickness not greater than approximately 3 mils.

10. An article of manufacture comprising a substantially inflexible sheeted asbestos cement slab having a weather-proof unfused and unvitrified colored, substantially non-blooming siliceous coating firmly bonded thereto, the coating being formed in situ and comprised of the in situ dried and fired product of an intimate coating mixture comprising a water-insoluble complex alkali metal fluoride, an argillaceous aluminum silicate and a film-forming alkali silicate, said coating mixture being dried at a superatmospheric temperature below 600° F. and then being fired at a higher temperature, said alkali silicate being present on the dry basis to extent of 0.5–1.2 parts by weight per part of total other solids and said alkali metal fluoride being present in substantial but lesser proportion by weight than said argillaceous aluminum silicate, said coating having a thickness not greater than approximately 3 mils, being permeable to permit breathing of moisture by the underlying slab therethrough and being substantially insoluble and non-intumesced and said cement slab being substantially free from the effects of destructive calcination.

11. An asbestos Portland cement shingle provided on one face only with a weather-proof unfused and unvitrified, non-intumesced and uncrazed, non-blooming siliceous surface coating having a thickness of the order of 3 mils, said surface coating being formed in situ and comprised of the solid-phase reaction product of an intimate coating mixture comprising clay and a film-forming alkali silicate, and a coloring pigment, dried at superatmospheric temperatures below 600° F. and then fired to insolubility at a temperature of 850° to 950° F., the components of the coating being proportioned such that the alkali silicate is in the proportion on the dry basis of 0.8–1.2 parts by weight per part of total other solids of the coating and the mol ratio of $SiO_2$ to alkali metal oxide is at least approximately as great as 2.6 but not greater than approximately 3.2, the said coating presenting an uncrazed permanently colored surface which appears continuous when viewed under a microscope using a magnification of 100X but said coating being sufficiently permeable to permit breathing of moisture by the underlying asbestos-Portland cement base therethrough, the shingle being substantially unwarped and having substantially the mechanical strength of a corresponding uncoated shingle.

12. A process for producing a weather-proof siliceous coating upon a preformed calcinable calcareous lithic cement slab, comprising coating the slab with an aqueous solution of film-forming alkali silicate containing an alumina-bearing insolubilizing material and a pigment, so composed as to produce the specified coating product, causing an insolubilizing reaction by first heating the coating at a superatmospheric temperature below 600° F. to dry the coating and to avoid any substantial intumescence of the coating and destructive calcination of the slab during the subsequent firing, and firing the coating at a temperature of the order of 700° F. so as to produce a substantially insoluble and non-intumesced coating without vitrifying or fusing the same and without heating the slab to the point of destructive calcination, said alkali silicate being present, on the dry basis to the extent by weight of 0.5–1.2 of total other solids and the mol ratio of silica to alkali metal oxide in said alkali silicate being between 2.0 and 3.22.

13. A process for producing a weather-proof non-intumesced siliceous coating upon a preformed calcinable lithic slab comprising Portland cement, comprising coating the slab with an aqueous solution of alkali silicate intimately admixed with an argillaceous aluminum silicate in proportion such as to produce the specified coating product, heating at a temperature of 400° to 600° F. to condition the slab and its coating so as to substantially avoid intumescence of the coating and destructive calcination of the slab during said heating and subsequent firing, by subjecting the coated slab to a controlled current of heated air, and subjecting the coating at a temperature above the range aforesaid to firing which does not heat the base to the point of destructive calcination, the firing temperature and time being such as to produce a substantially insoluble, non-blooming and non-intumesced coating but insufficient to vitrify or fuse the same, said alkali silicate being present, on the dry basis to the extent by weight of 0.5–1.2 of total other solids and the mol ratio of silica to alkali metal oxide in said alkali silicate being between 2.0 and 3.22.

14. A process for producing a weather-proof siliceous coating upon a flat sheeted calcinable calcareous lithic cement slab having free surface CaO present, comprising coating the slab with an aqueous solution of alkali silicate having an initial ratio of silica to alkali metal oxide within the range 2.0–4.0 and intimately admixed with an argillaceous aluminum silicate, the alkali silicate on a dry basis amounting to approximately 0.6–1.2 parts by weight per part of total other solids in the coating, heating at superatmospheric temperatures not exceeding about 600° F. to condition the slab and its coating and to drive off a substantial proportion of the moisture present so as to substantially avoid intumescence of the coating and destructive calcination of the slab during said heating and subsequent firing at higher temperatures, and subjecting the coating to firing which does not heat the base to the point of substantial destructive calcination, the maximum firing temperature of the coating being within the range of 700–1100° F. and sufficient to produce substantially complete insolubilization.

15. A process of producing a weather-proof siliceous coating upon a preformed calcinable flat sheeted lithic slab, comprising coating the slab with an aqueous solution of sodium silicate intimately admixed with a coloring pigment and kaolin, the sodium silicate having an initial silica ratio of approxmately 2.0–3.22 and amounting on a dry basis to approximately 0.5–1.2 parts by weight per part of total other solids of the coating, heating by a controlled current of heated air at a temperature not in excess of 600° F. to condition the slab and its coating so as to substantially avoid intumesence of the coating and destructive calcination of the slab during heating and subsequent firing at higher temperatures, and then subjecting the coating at increased temperatures to firing which does not heat the base to the point of substantial destructive calcination, the firing time and maximum temperature of the coating being sufficient to produce substantially complete insolubilization but insufficient to destructively calcine the base or produce intumescence, vitrification or fusion of said coating.

16. A process of producing a weather-proof siliceous coating upon a calcinable sheeted lithic cement slab, containing Portland cement and a heat-resistant fibrous binder, comprising coating the slab with an aqueous solution of alkali silicate intimately admixed with a coloring pigment, an argillaceous aluminum silicate and a minor proportion of an insoluble complex fluoride, the ingredients being proportioned so as to produce an insolubilized substantially non-intumesced coating upon firing, heating the coated slab to a temperature of 400°–600° F. to condition it for firing, and then firing the coating at a temperature insufficient to fuse or vitrify the coating or destructively calcine the base but sufficient so that the coating is substantially completely insolubilized, said firing temperature being in the range of 850° to 1100° F.

17. A process of producing a weather-proof siliceous coating upon an asbestos, Portland cement slab, comprising coating the slab with an aqueous solution of alkali silicate intimately admixed with an argillaceous aluminum silicate and a minor proportion of a water-insoluble complex fluoride, and heating and firing at a maximum coating temperature above 700° F. but insufficient to vitrify or fuse the coating or destructively calcine the slab, said alkali silicate being present, on the dry basis to the extent by weight of 0.5–1.2 of total other solids and the mol ratio of silica to alkali metal oxide in said alkali silicate being between 2.0 and 3.22.

18. A process of producing a weather-proof siliceous coating upon the surface of a flat sheeted asbestos cement slab, comprising coating the slab with an aqueous solution of alkali silicate intimately admixed with an argillaceous aluminum silicate and a coloring pigment, the latter two components being roughly equal in amount and the alkali silicate on a dry basis amounting to approximately 0.5–1.2 parts by weight per part of the total other solids in the coating, and said alkali silicate being present on a dry basis to at least approximately as great an extent as said argillaceous aluminum silicate, heating the coated slab at an elevated temperature not exceeding 600° F. so as to substantially avoid intumescence of the coating and destructive calcination of the slab during said heating and subsequent firing, and firing the coating at a maximum temperature of 700–1100° F. and without heating the slab sufficiently to produce substantial destructive calcination, said alkali silicate having a mol ratio of $SiO_2$ to alkali metal oxide within the range 2.0–4.0.

LLOYD ARTHUR HATCH.
MAURICE EDWIN BUZZELL.